US010023388B2

(12) United States Patent
Talsma et al.

(10) Patent No.: US 10,023,388 B2
(45) Date of Patent: Jul. 17, 2018

(54) POSITIVE-DRIVE SPIRAL CONVEYOR

(71) Applicant: Laitram, L.L.C., Harahan, LA (US)

(72) Inventors: Casper Fedde Talsma, Valencia (ES); David W. Bogle, Round Rock, TX (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 15/337,147

(22) Filed: Oct. 28, 2016

(65) Prior Publication Data

US 2017/0043955 A1    Feb. 16, 2017

Related U.S. Application Data

(60) Division of application No. 13/805,608, filed as application No. PCT/US2011/043352 on Jul. 8, 2011, now Pat. No. 9,481,523, and a continuation-in-part of application No. 12/834,314, filed on Jul. 12, 2010, now Pat. No. 8,181,771.

(60) Provisional application No. 61/479,620, filed on Apr. 27, 2011.

(51) Int. Cl.
B65G 21/18 (2006.01)
B65G 17/08 (2006.01)
B65G 15/30 (2006.01)

(52) U.S. Cl.
CPC ........... B65G 17/086 (2013.01); B65G 15/30 (2013.01); B65G 21/18 (2013.01)

(58) Field of Classification Search
USPC ........................................................ 198/778
See application file for complete search history.

(56) References Cited

U.S. PATENT DOCUMENTS

| 3,315,492 A | 4/1967 | Dreksler |
| 3,348,659 A | 10/1967 | Roinestad |
| 3,664,487 A | 5/1972 | Ballenger |
| 4,036,352 A | 7/1977 | White |
| 4,118,181 A | 10/1978 | Onodera |
| 4,450,953 A | 5/1984 | LeCann et al. |
| 4,741,430 A | 5/1988 | Roinestad |
| 4,852,720 A | 8/1989 | Roinestad |
| 4,858,750 A | 8/1989 | Cawley |
| 4,944,162 A | 7/1990 | Lang et al. |
| 4,981,208 A | 1/1991 | Jones |
| 5,069,330 A | 12/1991 | Palmer et al. |
| 5,133,449 A | 7/1992 | Spangler |
| 5,139,135 A * | 8/1992 | Irwin .................. B65G 17/086 198/778 |

(Continued)

FOREIGN PATENT DOCUMENTS

EP    1281641 A1    2/2003
WO    2011028918 A1    3/2011

*Primary Examiner* — Gene O Crawford
*Assistant Examiner* — Lester III Rushin
(74) *Attorney, Agent, or Firm* — James T. Cronvich

(57) ABSTRACT

A spiral conveyor for positively driving a conveyor belt along a helical path. The spiral conveyor includes a rotating cylindrical tower with parallel drive members extending from the bottom to the top of the tower on its periphery. Each drive member includes an outwardly protruding ridge that varies in height from the bottom to the top of the tower. The variations in height facilitate the belt's entry onto and exit from the tower and robust, positive driving engagement with the inside edge of the belt along the majority of its path along the tower.

13 Claims, 9 Drawing Sheets

(56) References Cited

U.S. PATENT DOCUMENTS

| | | | |
|---|---|---|---|
| 5,310,045 | A | 5/1994 | Palmer et al. |
| 6,234,322 | B1 | 5/2001 | Paladin |
| 6,484,379 | B2 | 11/2002 | Palmaer |
| 6,564,930 | B1 | 5/2003 | Colding-Kristensen et al. |
| 7,258,226 | B2 | 8/2007 | Nelson et al. |
| 7,347,316 | B2 * | 3/2008 | Heber .................. B65G 17/064 198/756 |
| 8,302,764 | B2 | 11/2012 | Johnson |
| 8,453,827 | B2 | 6/2013 | Corley et al. |
| 2009/0038916 | A1 | 2/2009 | Van Faassen |
| 2011/0056806 | A1 | 3/2011 | Johnson |
| 2012/0006654 | A1 | 1/2012 | Talsma |
| 2012/0125742 | A1 | 5/2012 | Corley et al. |
| 2013/0213773 | A1 | 8/2013 | Talsma et al. |
| 2014/0299450 | A1 | 10/2014 | Tassy, Sr. et al. |

* cited by examiner

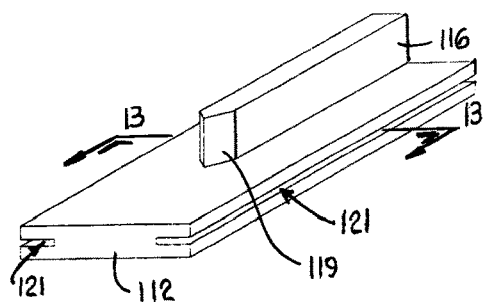
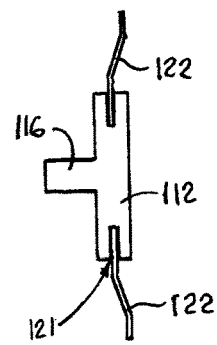
FIG. 12    FIG. 13
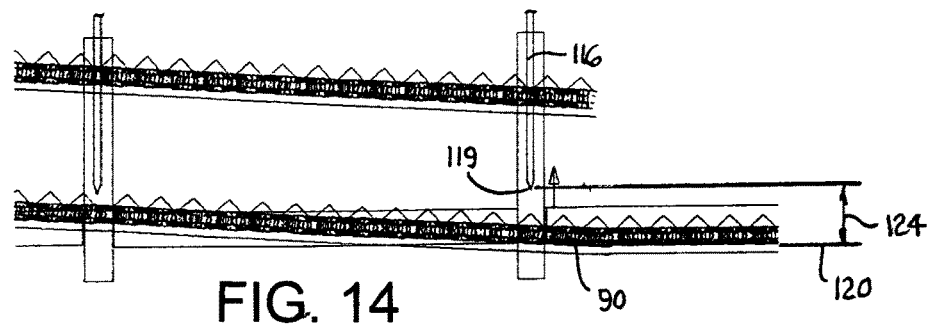
FIG. 14
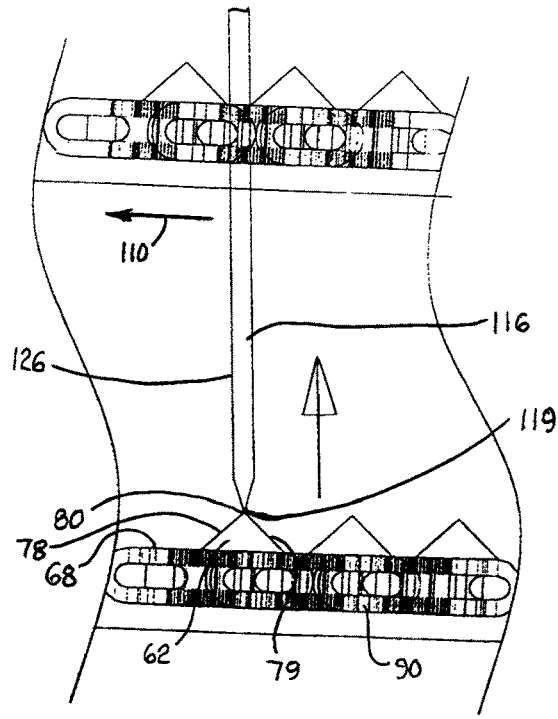
FIG. 15

POSITIVE-DRIVE SPIRAL CONVEYOR

BACKGROUND

The invention relates generally to power-driven conveyors and more particularly to spiral conveyors in which a conveyor belt is positively driven in a helical path around a rotating drive tower.

Conveyor belts are often used to convey articles, such as food stuffs and other materials, through cooled or heated environments. Spiral conveyors, in which a conveyor belt follows a helical path winding around a central tower, drum, or cage, are used in freezers and ovens to provide a long conveying path with a small footprint.

Some helical conveyors are constructed with a helical track supported on a central non-rotating tower. The conveyor belt is driven around the helical track by drive sprockets at a single location outside the helical path. The maximum tension in the belt, which occurs just ahead of its engagement with the drive sprockets, can be quite high for such a long belt. To reduce the maximum belt tension, overdrive spiral conveyor systems are used. In these overdrive systems, the conveyor belt is driven by frictional contact between the inside edge of the belt and the faster-rotating outer surface of the rotating drum about which the belt is helically wrapped. Because the belt is driven along the entire helical path, the maximum belt tension is decreased. But some tension is still needed for effective frictional engagement between the drum and the belt edge. Furthermore, the frictional engagement causes wear in the belt edge and the outer drum surfaces. Because a large portion of the rotational energy required to drive the drum is lost to friction, the motor and power requirements can be quite high. And, because overdrive systems are sensitive to friction between the outside of the drum and the inside edge of the belt, the proper settings of tension and overdrive vary from installation to installation.

Positively driven spiral systems, in which drive structure on the outside of a rotating cage engages structure on the inside of a conveyor belt, have been used to overcome some of the shortcomings of overdrive systems. Because there is positive engagement between regularly spaced drive structure on the cage and regularly spaced edge structure on the inside edge of the belt, there is no slip as in overdrive systems. No additional tensioning is needed and frictional losses are less. But one problem with positively driven spiral systems is in cleanly engaging the belt with and disengaging it from the drive structure on the cage.

SUMMARY

A spiral conveyor embodying features of the invention comprises a drive tower that extends from a bottom to a top and rotates about a vertical axis. Parallel drive members extend in length from the bottom to the top of the drive tower. Each of the drive members has an outwardly projecting ridge whose distance from the vertical axis varies from the bottom to the top of the drive tower. In one version the drive tower has an upper portion with a first diameter and a skirt portion tapered outwardly away from the vertical axis toward the bottom of the drive tower. In another version each drive member includes an upper segment at the top of the drive tower wherein the ridge in the upper segment tapers down toward the top of the drive tower. In a third version each drive member includes a lower segment at the bottom of the drive tower and wherein the ridge in the lower segment is tapered along a portion of its length. A conveyor belt is positively driven on a helical path around the drive tower by the ridges of the drive members engaging the inside edge of the belt.

BRIEF DESCRIPTION OF THE DRAWINGS

These features of the invention, as well as its advantages, are better understood by referring to the following description, appended claims, and accompanying drawings, in which:

FIG. 12 is an oblique view of a portion of a drive member of a spiral conveyor as in FIG. 11;

FIG. 13 is a cross section of the drive member of FIG. 12 taken along lines 13-13;

FIG. 14 is a side elevation view of a portion of the spiral conveyor of FIG. 11 showing the drive tower at the belt entry level;

FIG. 15 is an enlarged view at the belt entry level of the spiral conveyor of FIG. 11 showing the initial engagement of the conveyor belt with the drive members;

DETAILED DESCRIPTION

Figure 1:
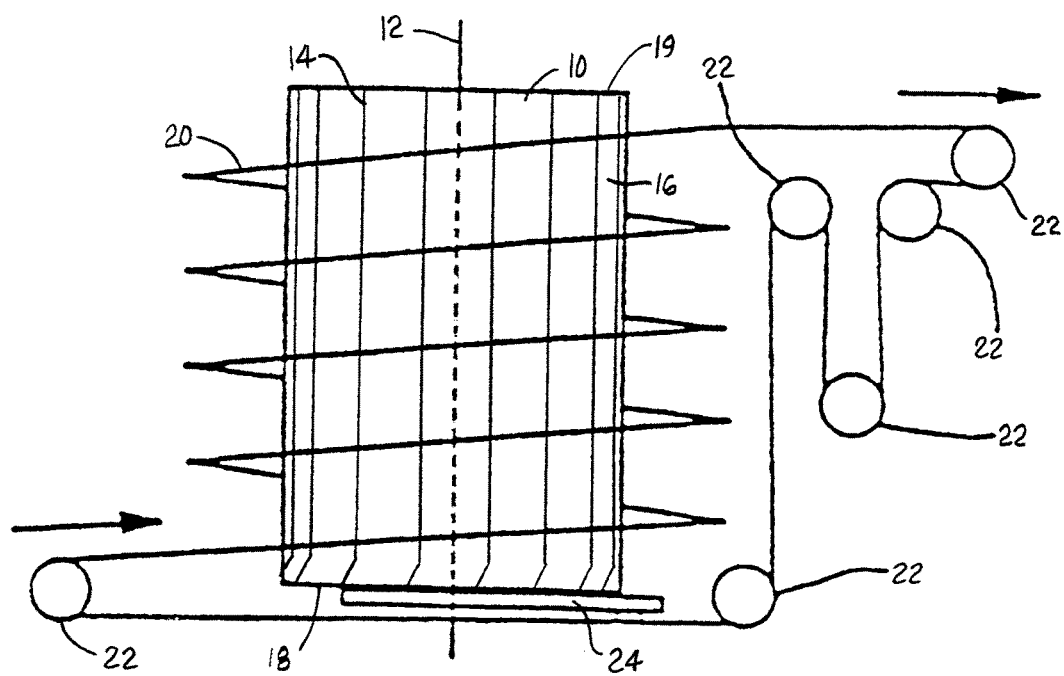
FIG. 1 is a side elevation schematic of a spiral conveyor system embodying features of the invention.

A spiral conveyor is shown schematically in FIG. 1. The spiral conveyor includes a drive tower 10 in the form of a cylindrical drum or cage that is driven to rotate about a vertical axis 12. The rotating tower has a plurality of parallel, generally vertical drive members 14 spaced apart regularly around its periphery 16. Each drive member extends in length between the bottom 18 and the top 19 of the tower. The conveyor belt 20 follows a multi-tiered helical path around the tower. The path is defined by a helical carryway or by a carryway at the bottom and stacker plates mounted on the belt. The inside edge of the belt positively engages the drive members, which drive the belt up the tower as it rotates. The belt travels around various take-up, idle, and feed sprockets 22 as it makes it way from the exit at the top of the tower back to the entrance at the bottom. The tower 10 is mounted at its bottom to a base 24 and is rotated by a motor and gears (not shown).

Figures 2A, 2B:
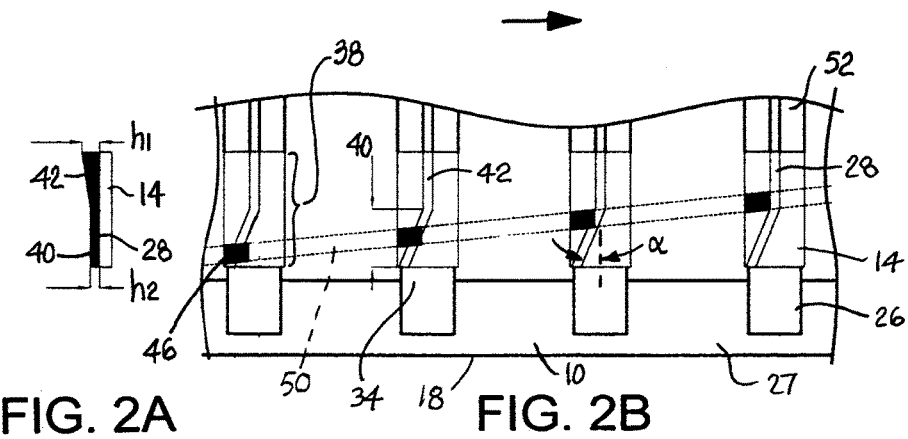
FIGS. 2A and 2B are profile and head-on views of a lower segment of the drive members of the drive tower of FIG. 1.
Figure 2C:
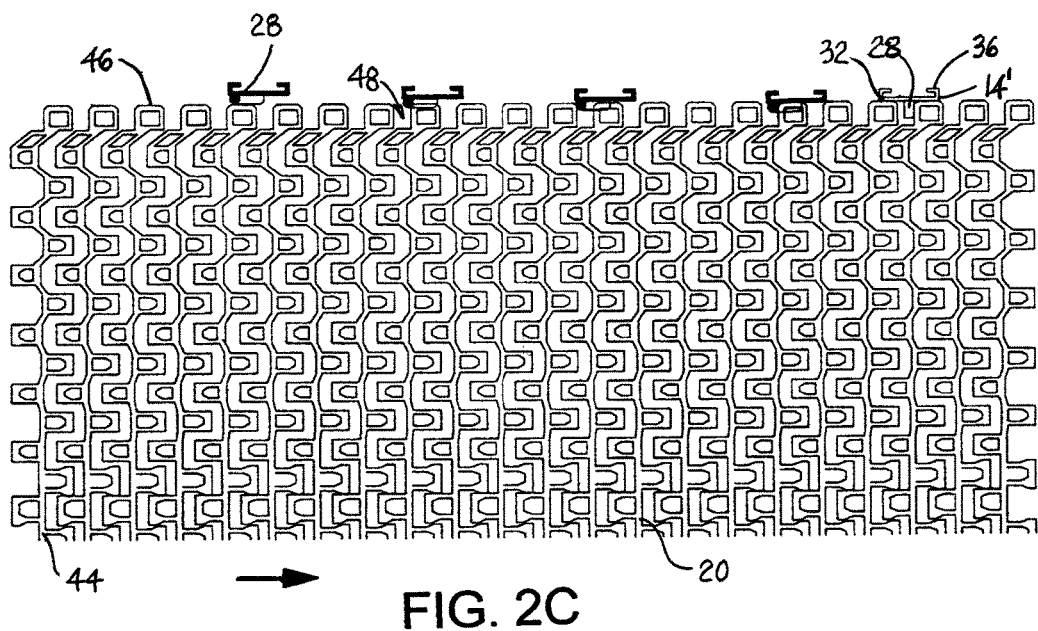
FIG. 2C is a top plan view of the spiral conveyor belt entering the lower segment of the drive members of the drive tower of FIG. 1.

Each of the drive members 14 comprises a generally vertical rail 26, which is affixed at the bottom 18 to a lower ring 27 of the drive tower 10, and a ridge 28 that protrudes outward of the rail, as shown in FIGS. 2A and 2B. The ridge is shown formed on an overlay 32 that covers the outer face 34 of the rail along just about all its length. As shown in FIG. 2C, tabs 36 hold the overlay to the rail. Instead of being formed on an overlay, the ridge could be welded directly onto the rail or formed monolithically with it.

In a lower segment 38 of each drive member, the ridge 28 includes a constant-height region 40 and a tapered region 42. A constant-height region begins at the bottom of the rail and extends upward to the tapered region. The height of the ridge 28 increases from a height $h_2$ in the constant-height region to a maximum height $h_1$ at the upper end of the tapered region. In other words, the distance of the ridge 28 from the vertical axis 12 (FIG. 1) of the drive tower increases from a constant distance to a greater distance at the upper end of the tapered region. The constant-height region of the lower segment 38 is angled off vertical by an angle α.

The off-vertical orientation and the low height $h_2$ of the ridge in the bottom portion of the lower segment of the drive tower facilitate the entry of the conveyor belt 20 onto the rotating tower, as shown in FIGS. 2B and 2C. The conveyor belt 20 is shown as a modular plastic conveyor belt constructed of a series of rows of belt modules 44 conventionally interconnected row-to-row by hinge rods (not shown). As the belt advances tangentially in to the rotating tower 10, one of its inside edges 46 may contact one of the ridges 28. As the belt is directed more closely toward the drive tower, the ridge eventually slides off the inside edge and into a gap 48 between adjacent belt rows. The angled orientation of the ridge in the lower segment helps guide the belt into proper engagement as it rides along its inclined helical path 50. By the time the belt reaches the tapered region 42 of the lower segment 38 of the drive members, the ridge has assumed a position just upstream of the inside edge of a belt row. In this position, the driving member is engaged with the inside edge of the belt to positively drive it along the helical path 50 without slip. In the tapered region 42, the ridge gradually increases in height to its maximum height $h_1$. The gradual increase further aids in the transition of the belt into full positive engagement with the rotating tower, as indicated by the max-height drive member 14'.

Figures 3A, 3B:
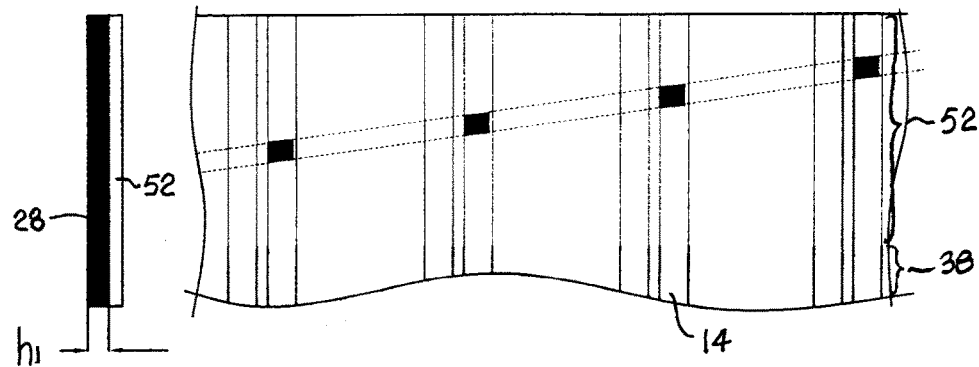
FIGS. 3A and 3B are profile and head-on views of an intermediate segment of the drive members of the drive tower of FIG. 1.
Figures 4A, 4B:
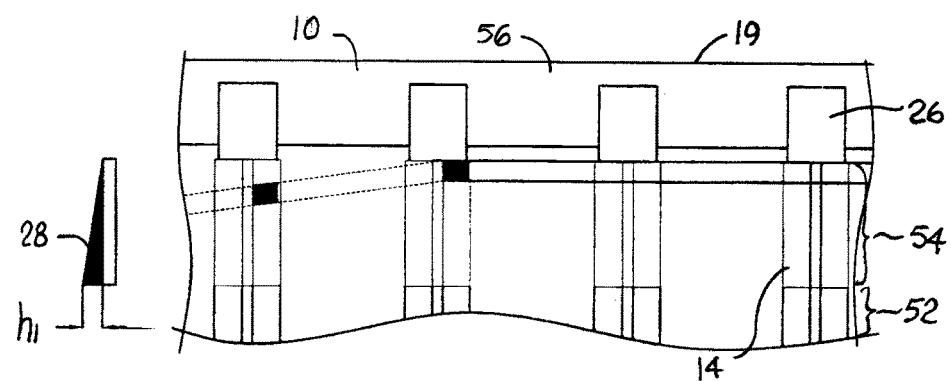
FIGS. 4A and 4B are profile and head-on views of an upper segment of the drive members of the drive tower of FIG. 1.

The ridge 28 extends out to the maximum height $h_1$ in an intermediate segment 52 of each drive member 14. In the intermediate segment, the distance of the ridge from the vertical axis 12 (FIG. 1) is constant. The intermediate segment is disposed on the periphery of the drive tower just above the lower segment 38, as shown in FIGS. 3A and 3B. The intermediate segment constitutes the majority of the height of the tower and, consequently, provides most of the driving engagement with the conveyor belt. The intermediate segment may be vertical as shown or slanted off vertical. Just ahead of the belt's exit from the top 19 of the tower 10, the height of the ridge tapers from the maximum height $h_1$ to zero at the top, as shown in FIGS. 4A and 4B. The tapering occurs in an upper segment 54 of each drive member 14. The top of each rail is affixed to an upper rim 56. The decreasing height of the ridge 28, or its distance from the drive tower's vertical axis, in the upper segment allows the belt to disengage gradually and neatly from the drive members of the rotating tower.

Thus, the spiral conveyor of FIGS. 1-4 positively drives a conveyor belt without overdrive along a helical path with drive members that engage the inside edge of the belt with a ridge that varies in height from the bottom to the top of the rotating spiral drive tower.

Figure 5A:
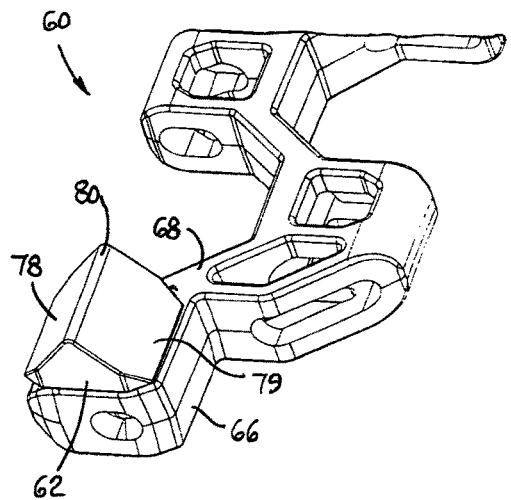
FIGS. 5A and 5B are top and bottom axonometric views of an inside edge of a sideflexing conveyor belt module embodying features of the invention.
Figure 5B:
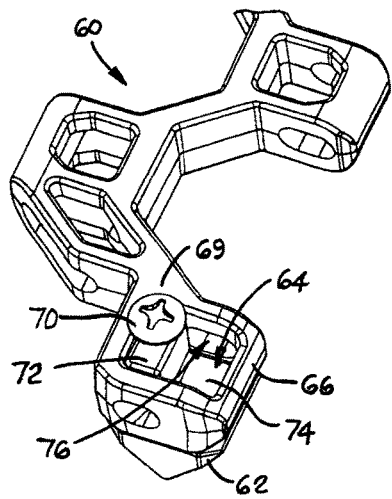

An edge belt module 60 shown in FIGS. 5A and 5B can be used to construct a sideflexing conveyor belt with different edge structure from that of the belt 20 of FIG. 2C. The edge module 60 has a tent-shaped tooth 62 attached to a cavity 64 in a side edge 66 of the belt. The tooth is pressed into the cavity 64 from the top side 68 of the module. The head of a screw 70 screwed into a corner of a projection 72 extending from the base 74 of the tooth grabs the bottom side 69 of the module at an inside corner of the cavity to attach the tooth to the module. The tooth can be detached from the module by removing the screw. The projection 72 also partially occludes the module's pivot rod hole 76 to help retain the hinge rod within the belt. In this version of the edge module, the tooth could be inserted from the bottom side 69 instead and retained in the same way. So these teeth can extend upward from the top side 68 or downward from the bottom side 69. The tent-shaped tooth has a pair of guide surfaces 78, 79 that converge with distance from the distal end 80 of the tooth.

Figure 6:
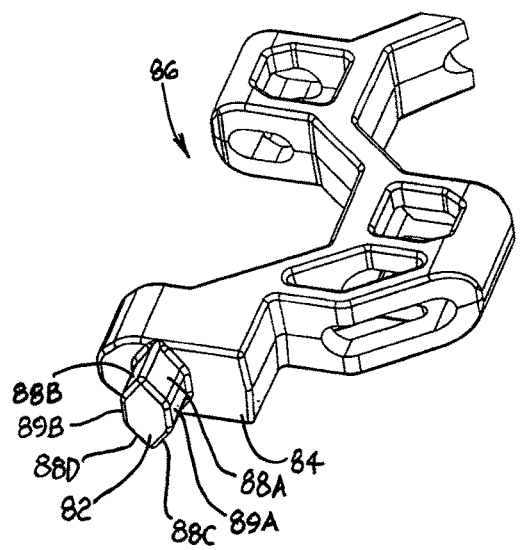
FIG. 6 is an axonometric view of the inside edge of another version of a sideflexing conveyor belt module embodying features of the invention.
Figure 7:
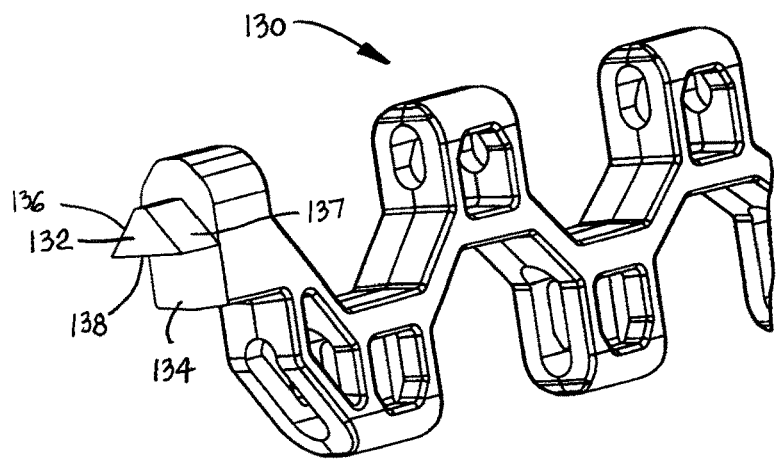
FIG. 7 is an axonometric view of the inside edge of yet another version of a sideflexing conveyor belt module embodying features of the invention.

Another version of a tooth extending from the inside edge of a belt module is shown in FIG. 6. In this module, a diamond-prism-shaped tooth 82 extends radially outward of the inside edge 84 of the module 86. The diamond-shaped tooth is unitarily molded with the module and has four guide surfaces 88A-D and two vertical drive faces 89A, 89B. It should be clear that the tent-shaped tooth 62 of FIGS. 5A and 5B could be unitarily formed with the edge module and the diamond-shaped tooth of FIG. 6 could be made as a separate piece that can be attached to the module. Another belt module with a unitarily molded tooth is shown in FIG. 7. The belt module 130 has a tooth 132 in the shape of a truncated triangular prism projecting radially outward from an inside edge 134 of the module. Guide surfaces 136, 137 converge from top and bottom surfaces of the module. The base of the triangular prism acts as a drive face 138. The belt module 140 of FIG. 8 has a tooth 142 in the form of a cylindrical oval. The tooth has rounded guide surfaces 144, 145 with opposite drive faces 146, 147 lying between.

Figure 10:
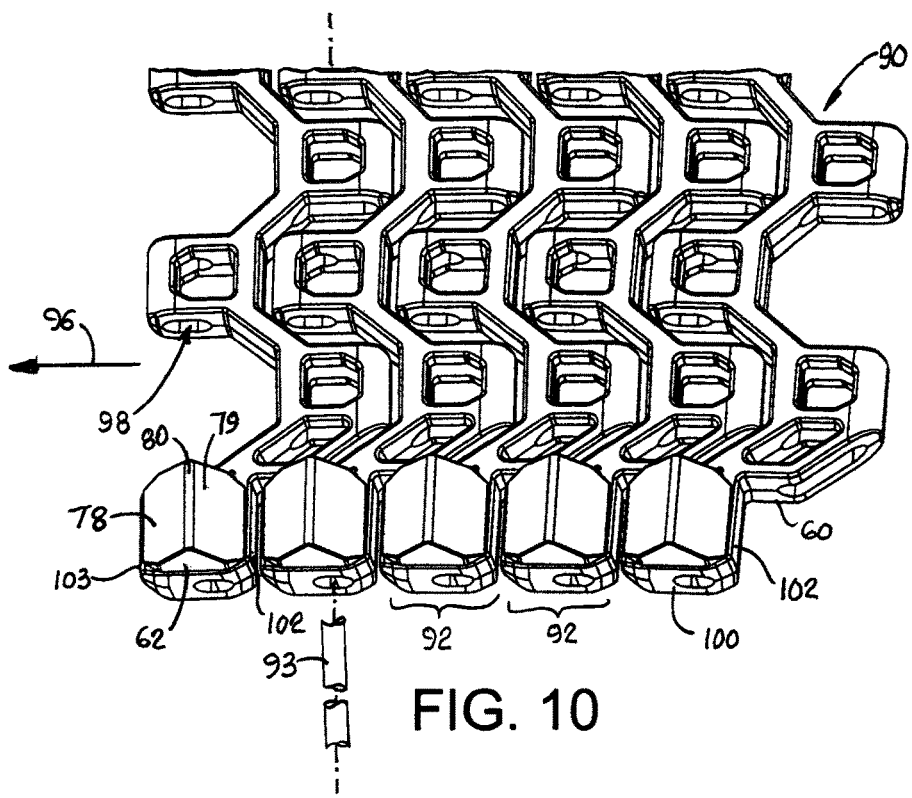
FIG. 10 is an axonometric view of a portion of the inside edge of a conveyor belt constructed of the modules of FIGS. 5A and 5B.

A portion of a conveyor belt 90 made of modules having an inside edge as in FIGS. 5A and 5B is shown in FIG. 10. The belt portion shows the modules linked together in rows 92 by hinge rods 93 at hinge joints 94 extending perpendicular to the conveying direction 96. The pitch of the belt is the distance between consecutive hinges. Hinge-rod apertures 98 are elongated in the conveying direction to provide enough play in the conveying direction for the side edge 100 of the belt to collapse at the inside of a turn while the opposite outside edge expands to follow its longer path on an outer radius. Because the belt 90 can be in low tension entering a spiral drive tower, the rows may be collapsed together as shown in FIG. 10. The trailing guide surfaces 79 of the teeth 62 decline from their distal ends 80 toward drive faces 102 facing consecutive trailing modules. The leading guide surfaces 78 of the teeth 62 decline from their distal ends 80 in the opposite direction toward rearward-facing drive faces 102 on consecutive leading modules. Opposite faces 103 on the edges of the belt can be used as drive faces if the belt is operated in the opposite direction.

Figure 11:
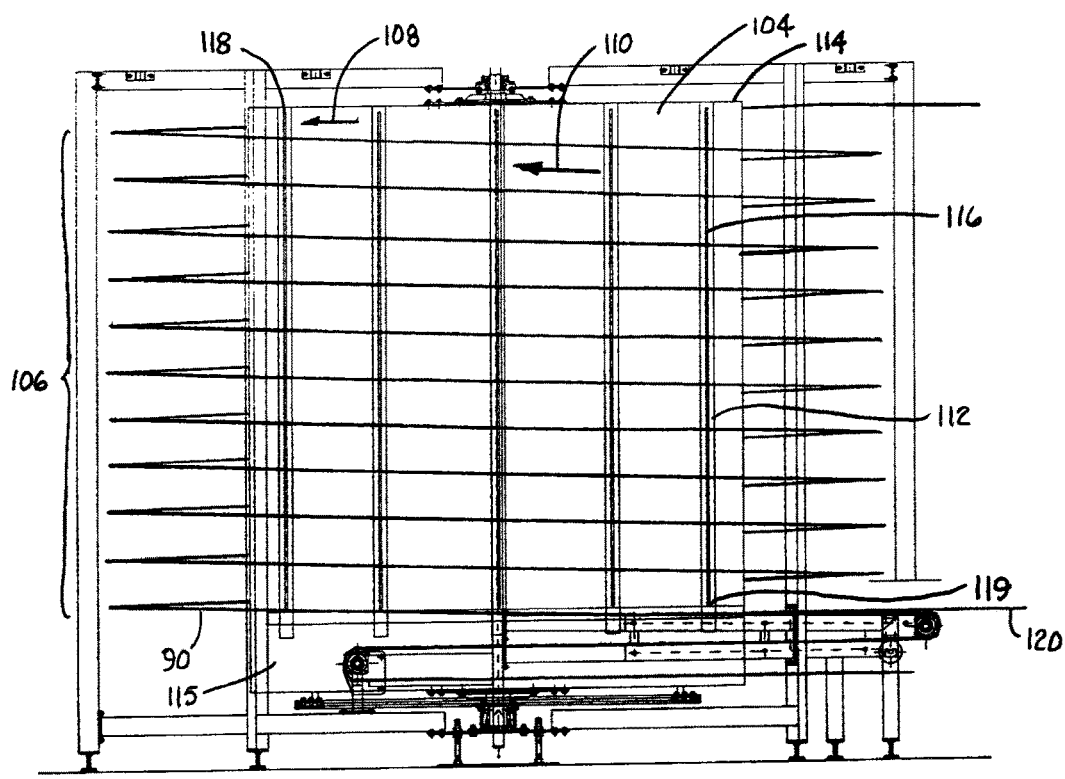
FIG. 11 is a side elevation view of another spiral conveyor using a modular conveyor belt as in FIGS. 5-8.

A spiral drive tower 104 is shown in FIG. 11 with the conveyor belt 90 following a helical path 106 around the periphery of the tower. Vertical drive members 112 extend in length from the top 114 to the bottom 115 of the tower. The drive members are preferably positioned on spacings equal to an integral multiple of the belt pitch for optimal operating characteristics. But the y could also be spaced at non-integral multiples of the belt pitch or non-uniformly at differing integral multiples of the belt pitch. Ridges 116 protrude radially outward of the spaced apart drive members 112 from top ends 118 of the ridges to bottom ends 119. In this example, the conveyor is an upgoing spiral rotating in the direction 108 with a helically rising conveying direction 110. The belt initially engages the tower at a belt entry level 120 that is below the bottom ends 119 of the ridges. The belt rides around the tower on a slightly inclined path for about 90° or so, or whatever circumferential arc length is needed for the inside edge of the belt to collapse, before rising to the level of the bottom ends 119 of the ridges 116.

As shown in FIGS. 12 and 13, the bottom end 119 of the ridge 116 is tapered. The drive member 112 is a flat strip with the ridge protruding outward along the majority of its length. Grooves 121 in opposite edges of the strip receive the edges of peripheral structure 122 forming the tower's periphery.

The engagement of the conveyor belt with an upgoing spiral is shown in FIGS. 14 and 15. FIG. 14 shows the bottom tier of the conveyor belt engaging the tower below the bottom ends 119 of the ridges 116. The bottom ends of the ridges are indented a vertical distance 124 above the belt entry level 120. In this indented portion of the tower, the inside edge of the belt rides along the tower in frictional contact with the periphery of the tower to give the inside edge of the belt an opportunity to collapse. Eventually the belt 90 rises to the bottom ends 119 of the ridges 116. The distal end 119 of the ridge 116 first contacts the tooth 62 extending upward from the top side 68 of one of the belt rows in one of three places: (a) the leading guide surface 78; (b) the trailing guide surface 79; or (c) the distal end 80. If the initial contact is on the leading guide surface 78, the bottom end 119 of the ridge tends to ride down the leading guide surface and push the row rearward away from the leading row so that the ridge fits between the rows in a position to positively drive the leading row. If the bottom end 119 of the ridge 116 first contacts the trailing guide surface 79, the bottom end slides down the guide surface into the gap between the row and the consecutive trailing row into a position for the leading side 126 of the ridge to impart a driving force against the drive face 102 (FIG. 10) of the row. If the bottom end of the ridge initially contacts the top distal end 80 of the tooth 62, the ridge could slide down either guide surface, depending on friction and any belt tension.

Figure 8:
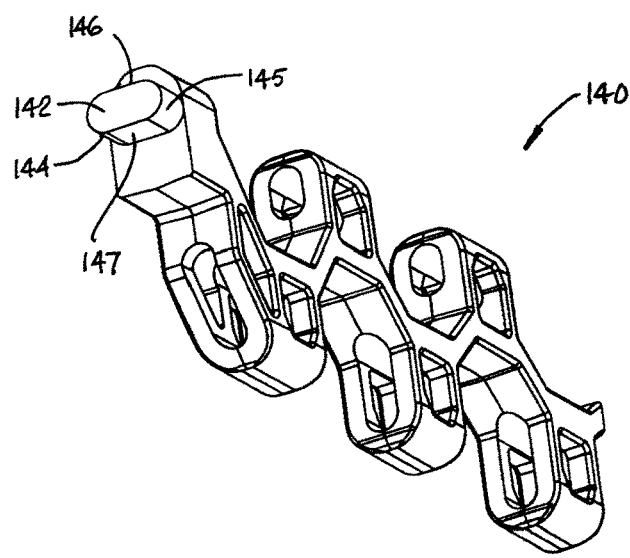
FIG. 8 is an axonometric view of the inside edge of still another version of a sideflexing conveyor belt module embodying features of the invention.

In a downgoing spiral, the operation is analogous. The belt entry level is above the top ends of the ridges at the top of the tower. The ridges are indented below the entry level by a vertical distance sufficient to allow the inside edge of the belt to collapse against the periphery of the tower. The teeth for a belt in a downgoing spiral extend downward from the bottom side of the belt to engage the top ends of the ridges. A conveyor belt constructed of modules as in FIG. 6 with guide surfaces 88A-D directed both up and down and drive faces 89A, 89B or as in FIG. 8 with rounded to and bottom guide surfaces 144, 145 and drive faces 146, 147 could be used in both downgoing and upgoing spirals and driven in either direction. The teeth in FIGS. 6 and 8 are symmetrical about their vertical and horizontal centerlines. The two guide surfaces 136, 137 of the triangular tooth 132 in the module of FIG. 7 allow a conveyor belt constructed of such modules to be driven against its drive face 147 in either an upgoing or a downgoing spiral.

Figure 9:
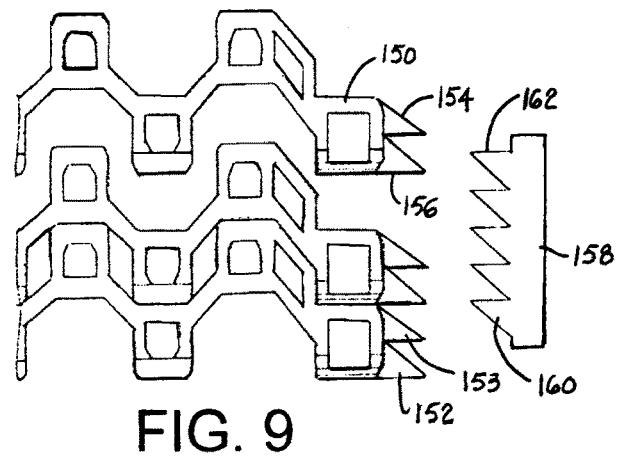
FIG. 9 is a top plan view of the inside edge of another version of a sideflexing conveyor belt and the periphery of a drive tower embodying features of the invention.

FIG. 9 shows a sideflexing conveyor belt with edge modules 150 that have multiple teeth extending radially outward of each row. Each of the teeth 152, 153 has a leading angled guide surface 154 and a trailing drive face 156 forming a sawtooth shape. Each drive member 158 on the periphery of the drive tower has a plurality of sawtooth-shaped ridges 160 with leading drive sides 162. The guide surfaces 154 guide leading drive sides 162 of the ridges into driving contact with a leading drive face 156. The ridges on the tower are slightly thinner than the teeth on the belt so that they interfit more easily. And the higher tooth density provides the drive tower with more available points of engagement.

Figure 16:
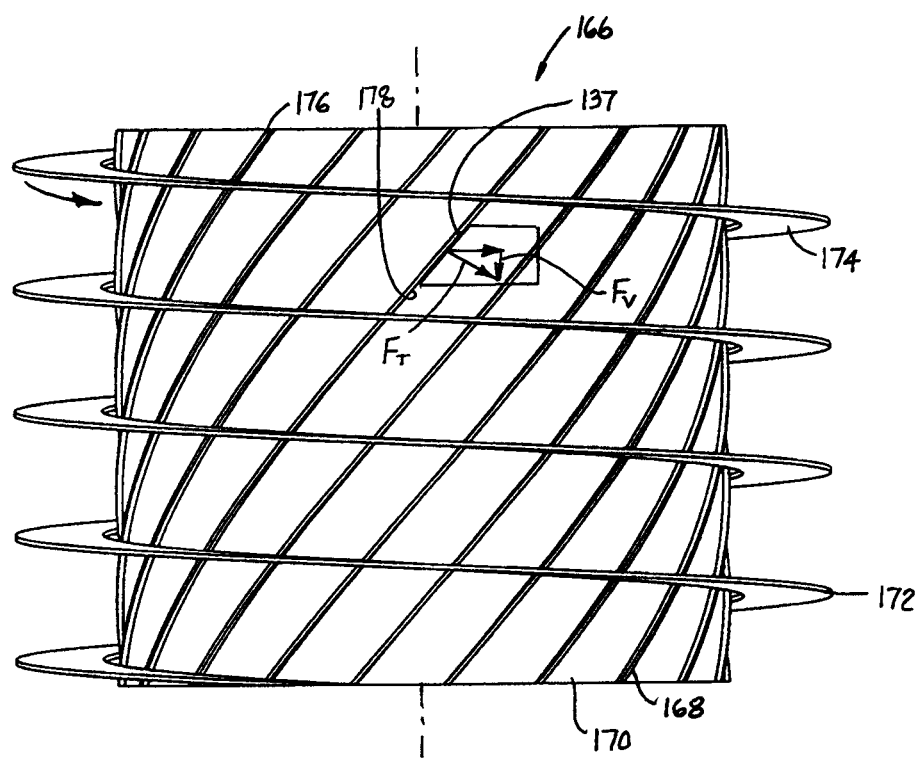
FIG. 16 is a side elevation view, with a superimposed force diagram, of another version of a spiral drive tower with helical drive bars on the periphery of the tower usable with conveyor belts made of modules as in FIGS. 5-8.

Even though the drive members on the peripheries of the drive tower shown in FIGS. 1-4 and in the drive tower shown in FIGS. 11-15 are generally vertical, the drive members could be slanted off vertical as shown in FIG. 16. The drive tower 166 has ridges 168 on its drive members slanted off vertical on the periphery 170 of the tower to form a helical arrangement. A conveyor belt 172 is shown operating as a downgoing spiral along a helical path 174. The belt is constructed with edge modules having teeth as in FIG. 7, i.e., teeth with a face oblique to the conveying direction, preferably at the same angle as the slant of the drive ridges off vertical. The bottom guide surface 136 guides the top end 176 of the drive members into initial contact with the belt edge. The leading edges 178 of the ridges engage the edge modules' top guide surfaces 137, which act as drive surfaces instead. The force diagram superimposed on the tower of FIG. 16 shows that the total force $F_T$ applied by the leading side 178 of the slanted ridge 168 against the similarly slanted tooth face 137 (shown enlarged) and acting in a direction normal to the face has a downward vertical component $F_V$, which helps hold the inside edge of the conveyor belt down. This obviates the need for the additional hold down structure that would be needed with a conveyor belt entering a spiral drive tower with vertical drive members as in the previous versions. And with the forward-slanted ridges of FIG. 16, the conveyor belt would move faster than the rotation of the drive tower. If the ridges were slanted in reverse, the belt would move slower.

Figure 17:
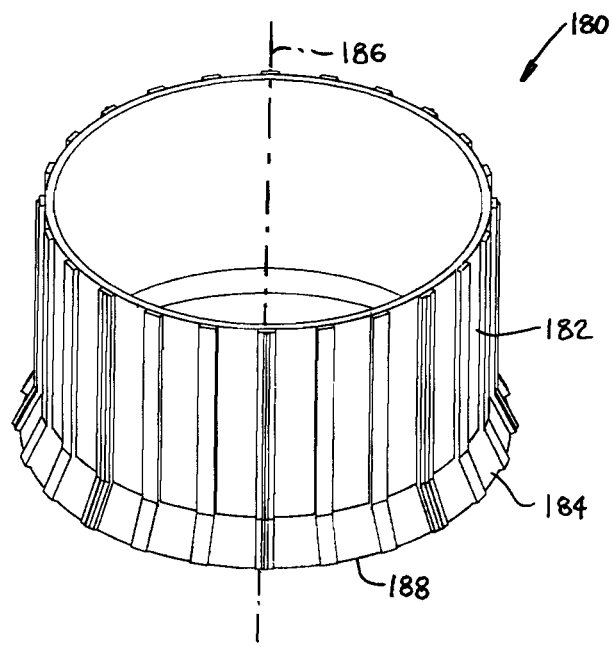
FIGS. 17 and 18 are oblique views of two other versions of drive towers with outwardly extending bottom skirt portions usable with conveyor belts made of modules as in FIGS. 5-8.
Figure 18:
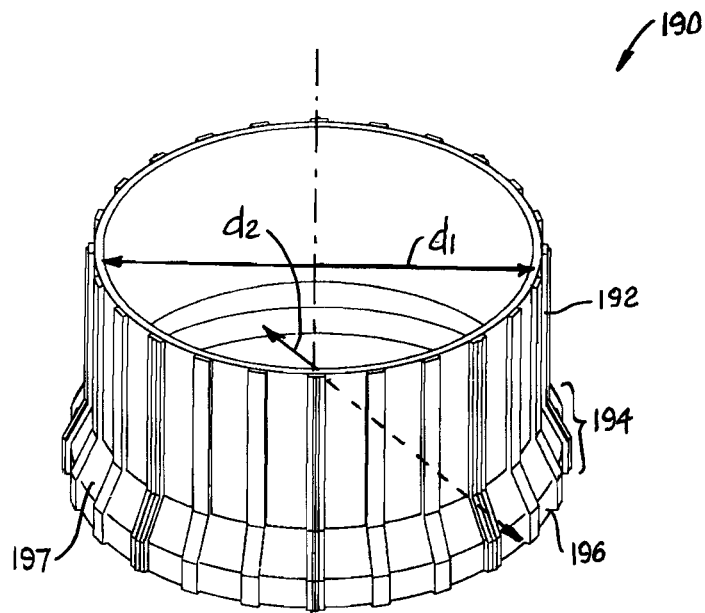

Two other versions of drive towers are shown in FIGS. 17 and 18. The drive tower 180 in FIG. 17 has a cylindrical upper portion 182 and a skirt portion 184 the tapers outwardly away from the tower's vertical axis 186 toward the bottom 188 of the tower. The drive tower 190 in FIG. 18 has an upper portion 192 with a first diameter $d_1$. A skirt portion 194 includes a bottom portion 196 having a second diameter $d_2$ that is greater than the first diameter $d_1$ of the upper portion 192. A tapered portion 197 connects the bottom portion 196 to the upper portion 192. (The degree of taper is exaggerated in the drawings.) A conveyor belt entering either of the skirted drive towers from the bottom has some amount of initial tension in the outside edge of the belt. As the inside edge of the conveyor belt begins to collapse as it rides spirally up the skirt portion of the tower, the diameter of the tower decreases slightly in the skirt portion to help relieve the tension in the outside edge of the conveyor belt.

Thus, the spiral conveyors of FIGS. 11-18 positively drive a conveyor belt without overdrive along a helical path with drive members that engage the inside edge of the belt with a ridge that is initially guided into a driving position against a drive face on the belt. And the spiral conveyor system also allows the use of belts whose inside turn radius does not match the radius of the drive tower.

What is claimed is:

1. A spiral conveyor comprising:
   a drive tower extending from a bottom to a top and rotating about a vertical axis;
   a plurality of parallel drive members extending in length from the bottom to the top of the drive tower;
   wherein each of the drive members includes an outwardly projecting ridge whose distance from the vertical axis varies from the bottom to the top of the drive tower;
   wherein the drive tower has an upper portion with a first diameter and a skirt portion tapered outwardly away from the vertical axis toward the bottom of the drive tower;
   a conveyor belt positively driven without slip on a helical path around the drive tower by the ridges of the drive members engaging an inside edge of the conveyor belt.

2. A spiral conveyor as in claim 1 wherein the skirt portion includes a bottom portion with a second diameter greater than the first diameter and a tapered portion connecting the bottom portion to the upper portion.

3. A spiral conveyor comprising:
   a drive tower extending from a bottom to a top and rotating about a vertical axis;
   a plurality of parallel drive members extending in length from the bottom to the top of the drive tower;
   wherein each of the drive members includes an outwardly projecting ridge whose distance from the vertical axis varies from the bottom to the top of the drive tower; and
   wherein each drive member includes an upper segment at the top of the drive tower wherein the ridge in the upper segment tapers down toward the top of the drive tower.

4. A spiral conveyor as in claim 3 wherein the ridge tapers linearly in the upper segment.

5. A spiral conveyor as in claim 3 wherein the ridge is continuous in length and having a lower segment connected to the upper segment by an intermediate segment and wherein the distance of the ridge from the vertical axis in the intermediate segment is a constant distance, the distance of the ridge from the vertical axis in the upper segment decreases toward the top of the drive tower from the constant distance to zero, and the distance of the ridge from the vertical axis in the lower segment decreases toward the bottom of the drive tower from the constant distance to a lesser distance.

6. A spiral conveyor as in claim 3 wherein the ridge has a profile from bottom to top that defines a first constant distance from the vertical axis, increasing to a greater second distance from the vertical axis, then remaining constant at the second distance, and finally decreasing in distance from the vertical axis to the top of the drive tower.

7. A spiral conveyor as in claim 6 wherein the ridge whose profile is constant at the first constant distance is angled off vertical.

8. A spiral conveyor as in claim 3 further comprising a conveyor belt positively driven on a helical path around the drive tower by the ridges of the drive members engaging an inside edge of the conveyor belt.

9. A spiral conveyor comprising:
   a drive tower extending from a bottom to a top and rotating about a vertical axis;
   a plurality of parallel drive members extending in length from the bottom to the top of the drive tower;
   wherein each of the drive members includes an outwardly projecting ridge whose distance from the vertical axis varies from the bottom to the top of the drive tower; and
   wherein each drive member includes a lower segment at the bottom of the drive tower and wherein the ridge in the lower segment is tapered along a portion of its length;
   a conveyor belt positively driven without slip on a helical path around the drive tower by the ridges of the drive members engaging an inside edge of the conveyor belt.

10. A spiral conveyor as in claim 9 wherein the distance of the ridge from the vertical axis in the lower segment is constant below the portion that is tapered.

11. A spiral conveyor comprising:
    a drive tower extending from a bottom to a top and having a vertical axis of rotation;
    a plurality of parallel drive members extending in length from the bottom to the top of the drive tower;
    wherein each of the drive members includes a ridge projecting radially outward to an outer edge;
    wherein each of the drive members includes a lower segment at the bottom of the drive tower and an upper segment extending from the lower segment toward the top of the drive tower;
    wherein the distance of the outer edge of the ridge from the vertical axis of rotation is a first distance in the upper segment and the distance of the outer edge of the ridge from the vertical axis of rotation is a greater second distance in a lower portion of the lower segment;
    a conveyor belt positively driven on a helical path around the drive tower by the ridges of the drive members engaging an inside edge of the conveyor belt.

12. A spiral conveyor as in claim 11 wherein the distance of the outer edge of the ridge from the vertical axis of rotation in an upper portion of the lower segment increases from the first distance at the upper segment to the greater second distance at the lower portion of the lower segment.

13. A spiral conveyor as in claim 12 wherein the distance of the outer edge of the ridge from the vertical axis of rotation in the upper portion of the lower segment increases linearly from the first distance to the greater second distance.

* * * * *

(12) INTER PARTES REVIEW CERTIFICATE (3431st)
United States Patent
Talsma et al.

(10) Number: US 10,023,388 K1
(45) Certificate Issued: Feb. 8, 2024

(54) POSITIVE-DRIVE SPIRAL CONVEYOR

(71) Applicants: Casper Fedde Talsma; David W. Bogle

(72) Inventors: Casper Fedde Talsma; David W. Bogle

(73) Assignee: LAITRAM, L.L.C.

Trial Number:

IPR2020-00593 filed Feb. 24, 2020

Inter Partes Review Certificate for:

Patent No.: 10,023,388
Issued: Jul. 17, 2018
Appl. No.: 15/337,147
Filed: Oct. 28, 2016

The results of IPR2020-00593 are reflected in this inter partes review certificate under 35 U.S.C. 318(b).

INTER PARTES REVIEW CERTIFICATE
U.S. Patent 10,023,388 K1
Trial No. IPR2020-00593
Certificate Issued Feb. 8, 2024

AS A RESULT OF THE INTER PARTES REVIEW PROCEEDING, IT HAS BEEN DETERMINED THAT:

Claims 9-13 are cancelled.

\* \* \* \* \*